United States Patent [19]

Bonin et al.

[11] 4,135,018
[45] Jan. 16, 1979

[54] THERMAL SHOCK RESISTANT HONEYCOMB STRUCTURES

[75] Inventors: George E. Bonin; William P. Lentz, both of Addison; Robert V. VanDeWoestine, Corning, all of N.Y.; Stuart M. Dockerty, deceased, late of Corning, N.Y., by Robert C. Dockerty, executor, Poughkeepsie, N.Y.

[73] Assignee: Corning Glass Works, Corning, N.Y.

[21] Appl. No.: 711,987

[22] Filed: Aug. 5, 1976

[51] Int. Cl.² ................................................ B32B 3/12
[52] U.S. Cl. .................................... 428/116; 422/211; 422/221; 252/477 R
[58] Field of Search ........................... 428/116–120; 156/197, 89; 23/288 FC; 252/477 R

[56] References Cited

U.S. PATENT DOCUMENTS

| 3,018,205 | 1/1962 | Barut | 428/116 |
|---|---|---|---|
| 3,070,198 | 12/1962 | Haskell | 428/118 X |
| 3,502,596 | 3/1970 | Sowards | 428/116 X |
| 3,616,141 | 10/1971 | Anderson | 428/116 |
| 3,790,654 | 2/1974 | Bagley | 264/177 R |
| 3,801,289 | 4/1974 | Wiley | 428/116 X |
| 3,826,603 | 7/1974 | Wiley | 264/41 X |
| 3,841,839 | 10/1974 | Wiley | 428/116 X |
| 3,885,977 | 5/1975 | Lachman | 428/116 X |
| 3,899,326 | 8/1975 | Frost et al. | 428/116 X |
| 3,903,341 | 9/1975 | Gerhold | 428/116 |
| 4,042,738 | 8/1977 | Gulati | 428/116 |

FOREIGN PATENT DOCUMENTS 525128  5/1956  Canada .................................... 428/116

Primary Examiner—Henry F. Epstein
Attorney, Agent, or Firm—Burton R. Turner; Clarence R. Patty, Jr.

[57] ABSTRACT

A plurality of cellular shapes for honeycomb structures having cells of uniform size and shape are disclosed having movable expansion joint means built into each individual cell structure, which joints can tolerate large strains without breaking.

12 Claims, 11 Drawing Figures

THERMAL SHOCK RESISTANT HONEYCOMB STRUCTURES

BACKGROUND OF THE INVENTION

This invention relates to the structural configuration of the cellular portions of a honeycomb structure, and more particularly to improved cellular structures having flexible expansion joints which resist thermal shock breakage.

Cellular or honeycomb structures made of a ceramic material have application as substrates in catalytic converters for the emissions from internal combustion engines. Due to the extreme temperature variations which such honeycomb structures are subjected to, it is imperative that the structures be provided with the highest thermal shock resistance possible. Naturally, it is desirable to utilize a material having a low coefficient of expansion, and to strengthen the web portions of the structure as much as possible to maintain their integrity. However, in view of the fact that the thickness of such web portions varies between about 0.002 inch and 0.050 inch so as to provide open frontal areas of about 75% or greater, and further in view of the fact that the materials utilized are necessarily of a porous nature so as to increase surface area and facilitate the adhesion of a catalyst thereon, the amount of strengthening and the number of acceptable compositions are severely limited. However, by incorporating proper web geometry (i.e. the configuration of the partition members forming the cells) it is possible to increase the thermal shock resistance by selecting a cell configuration which will provide improved thermal shock resistance through the utilization of movable joints or intersections of the cell walls, which joints absorb or compensate for compressive and tensile stresses generated in the body during thermal expansion and contraction thereof.

Honeycomb ceramic structures, which may be utilized as substrates in catalytic converters, are readily formed by extrusion, such as by utilizing the method and apparatus disclosed in U.S. Pat. No. 3,790,654. The composition of the extruded material may vary according to the desired properties to be obtained, however low expansion ceramic compositions are disclosed in U.S. Pat. No. 3,885,977, which have particular application in the formation of ceramic honeycomb structures for use as catalytic support matrices in emission control devices. Such matrices are formed with parallel passages or cells extending longitudinally therethrough with a minimum amount of cross sectional wall thickness, so as to provide open frontal areas of about 75% or greater. In order to provide uniform flow through such passageways and avoid "short circuiting", it is necessary that the cell structure forming such passages be uniform across the areal extent of the honeycomb matrix. That is, the cell structure forming the longitudinal passages should be uniform in both size and shape when viewed perpendicularly to the longitudinal axis of the honeycomb article, so that the flow front will experience substantially uniform impedance across the face of the honeycomb matrix.

Catalytic honeycomb support structures utilized in emissions control are generally housed within a casing or container such as shown in U.S. Pat. Nos. 3,801,289 and 3,841,839 forming a part of the exhaust system of an internal combustion engine. In view of the temperature of the exhaust gases which pass through the honeycomb structure and the temperatures generated by the catalytic action, the ceramic honeycomb structure is subjected to wide temperature variations causing expansion and contraction thereof within the outer housing or casing. As a result, the structure is subjected to substantial radial compressive forces during expansion caused by heat-up, and to a lesser degree tensile forces during cool-down. Therefore, although ceramic materials having relatively low coefficients of thermal expansion are utilized in extruding the honeycomb structures for use in catalytic converters, such structures are relatively brittle, and in order to inhibit the cracking or breaking-up of the ceramic core members due to thermal shock, it is necessary to provide the interconnecting webs or walls forming the cells with movable expansion joint means which can tolerate large strains without breaking.

It thus has been an object of the present invention to provide novel cell geometries for honeycomb structures which provide improved thermal shock resistance.

BRIEF DESCRIPTION OF THE PREFERRED EMBODIMENTS

Figure 1:
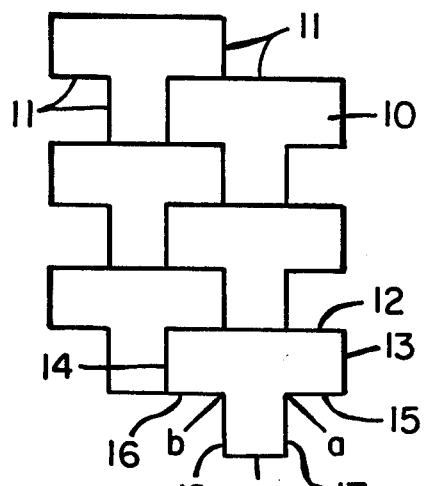
FIG. 1 is an enlarged schematic view of a fragment of the face of a honeycomb structure taken perpendicular to the longitudinal axis of said structure showing a T-shaped cellular configuration.

Referring now to the drawings, and particularly FIGS. 1 through 5, a plurality of different cell shapes are shown for forming a honeycomb structure. In FIG. 1, a matrix composed of T-shaped cells 10 is shown, in FIG. 2 the matrix is formed of L-shaped cells 20, in FIG. 3 the matrix is formed of "plus"-shaped cells 30, in FIG. 4 the matrix is formed of Z-shaped cells 40, and in FIG. 5 the matrix is formed of "bow tie"-shaped cells 30. As noted from the drawings, the cells forming each individual matrix are of an indentical size and shape such that a flow front presented to each such matrix will experience a substantially uniform impedance transversely across the face of such matrix. Each cell structure is provided with at least one movable or expansion joint which permits movement of the cell walls to compensate for stresses and strains generated by thermal expansion and contraction of the matrix.

Figure 1A:
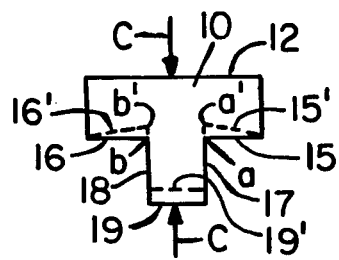
FIGS. 1a, 1b and FIGS. 2a, 3a, 4a, and 5a show the movement of the movable or expansion joints when the honeycomb cellular structures of FIG. 1 and FIGS. 2-5, respectively, are subjected to compressive forces.
Figure 1B:
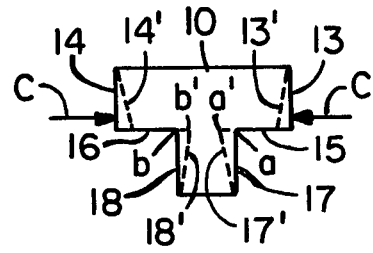

Referring now particularly to FIGS. 1, 1a and 1b, the T-shaped cells 10 are defined by the webbing or partitions 11 of the matrix forming wall portions of the cells.

As shown in FIG. 1, the wall portions include a top wall portion 12, a pair of upper side wall portions 13, 14, a pair of under wall portions 15, 16, a pair of lower sidewall portions 17, 18 and a bottom wall portion 19. Each T-shaped cell 10 has a pair of movable joints or expansion corners a and b formed between the under wall portions 15, 16 of the upper portion of the T and the intersecting lower side wall portions 17, 18 of the stem of the T, respectively.

Referring now to FIGS. 1a and 1b, the movement of expansion joints a and b is shown when the T-shaped cell 10 is subjected to various compressive forces as shown by the arrows C. In FIG. 1a, a compressive force represented by arrows C is shown being exerted across the cell 10 between top wall portion 12 and bottom wall portion 19. When the cell 10 is subjected to such a compressive force, it will be seen that the movable joints or expansion corners a and b move to new positions a' and b' respectively. Under wall portions 15 and 16 bend or pivot inwardly to positions 15' and 16' respectively, with lower side wall portions 17 and 18 moving longitudinally toward top wall 12, and thus displacing bottom wall 19 inwardly to a new position 19'.

With regard to FIG. 1b, compressive forces are shown as being exerted across upper side wall portions 13 and 14 by arrows C, which results in the displacement of movable joints or expansion corners a and b inwardly to positions a' and b', respectively. That is, upper side wall portions 13 and 14 are pivotally displaced inwardly to new positions 13' and 14', respectively, lower side wall portions 17 and 18 are pivotally displaced inwardly to new positions 17' and 18', respectively, and under wall portions 15 and 16 are longitudinally displaced inwardly of the cell 10 to accommodate the inward displacement of wall portions 13, 17 and 14, 18, respectively. It will be appreciated that if the compressive forces C of both FIGS. 1a and 1b were in fact tensile forces, the movement of the wall portions 15, 16, 17, 18 and 19 in FIGS. 1a and 13, 14, 15, 16, 17, and 18 in FIG. 1b would merely be in the opposite direction from that shown.

Figure 2:
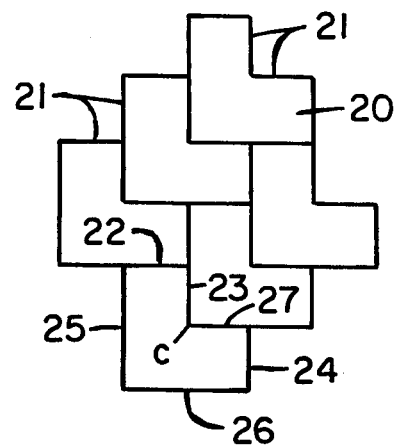
FIG. 2 is an enlarged schematic view of a fragment of the face of a honeycomb structure taken perpendicular to the longitudinal axis of said structure showing an L-shaped cellular configuration.

Referring now to FIG. 2, each L-shaped cell 20 is formed from matrix webbing or partitions 21 which abound and form the wall portions thereof, which include a top wall portion 22, upper side wall portion 23, lower side wall portion 24, full side wall portion 25, bottom wall portion 26 and upper ell wall portion 27. The upper side wall portion 23 of the upright portion of the ell and upper ell wall portion 27 of the base portion of the ell intersect to form a movable joint or expansion corner c.

Figure 2A:
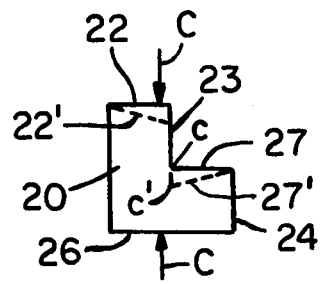

Referring now to FIG. 2a, a compressive force represented by arrows C exerted on top wall portion 22 and bottom wall portion 26 is shown resulting in the displacement of expansion joint c to a new position c'. Both top wall portion 22 and upper ell wall portion 27 are pivotally displaced inwardly of the cell 20, and upper side wall portion 23 is accordingly moved longitudinally to accommodate the displacement of wall portions 22 and 27 connected to each end thereof. It will be appreciated that a tensile force exerted along arrows C would merely result in the wall portions 22, 23 and 27 being displaced in the opposite direction from that shown in the drawing. Further, were compressive forces exerted on the cell structure 20 in a direction 90 degrees to that shown, wall portions 24, 23 and 27 would be displaced similarly to that shown for wall portions 22, 27 annd 23, respectively.

Figure 3:
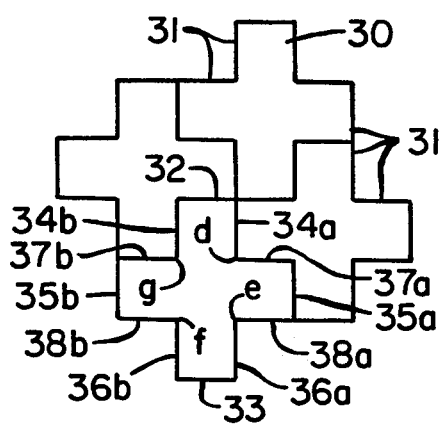
FIG. 3 is an enlarged schematic view of a fragment of the face of a honeycomb structure taken perpendicular to the longitudinal axis of said structure showing a "plus" shape cellular configuration.

Referring now to FIG. 3, the "plus" shaped cell structure 30 is formed from a plurality of webbing or partitions 31 which form a top wall portion 32, bottom wall portion 33, upper side wall portions 34a, 34b, middle side wall portions 35a, 35b, lower side wall portions 36a, 36b, upper arm portions 37a, 37b, and lower arm portions 38a, 38b. In addition, the upper and lower side wall portions of upper and lower protrusions connect with the upper and lower arm portions of the side protrusions, respectively, to form a plurality of movable joints or expansion corners d, e, f, and g.

Figure 3A:
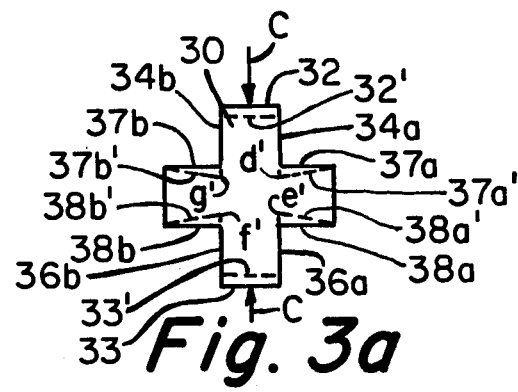

Referring now to FIG. 3a, it will be apparent that the deflection produced by a compressive force along arrows C is similar to that obtained with the T-shaped cell 10 of FIG. 1a, except that the plus-shaped cell 30 of FIG. 3a, in effect represents a double T laid top to top. Specifically, with the compressive force exerted across top wall portion 32 and bottom wall portion 33, the upper and lower arm portions 37a, 37b and 38a, 38b are pivotally displaced inwardly to positions represented by 37a', 37b' and 38a', 38b', respectively, resulting in the displacement of expansion joints d, e, f, and g to new positions d', e', f' and g', respectively. Top wall portion 32 is displaced inwardly to new position 32' through the longitudinal movement of upper side wall portions 34a and 34b, whereas bottom wall portion 33 is displaced inwardly to a new position 33' through longitudinal movement of lower side wall portions 36a, 36b. Again, were a tensile force substituted for the compressive force along arrows C, the same wall portions would deflect as shown in the drawing, except that the deflection or displacement would be outwardly instead of inwardly. Further, if the compressive force were exerted 90 degrees to that shown in the drawing, the results would be the same as if the drawing were rotated 90 degrees.

Figure 4:
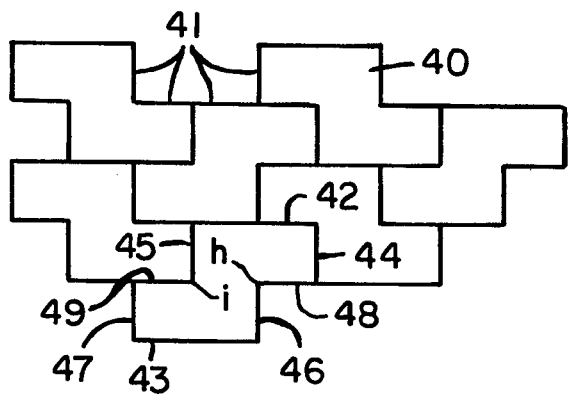
FIG. 4 is an enlarged schematic view of a fragment of the face of a honeycomb structure taken perpendicular to the longitudinal axis of said structure showing a Z-shaped cellular configuration.

Referring now to FIG. 4, Z-shaped cells 40 are formed from matrix webbing or partitions 41 which define wall portions of the cell 40, including top wall portion 42, bottom wall portion 43, upper side wall portions 44, 45, lower side wall portions 46, 47, under arm wall portion 48, and upper arm wall portion 49. Movable joints or expansion corners h, i are formed where the under arm wall portion 48 of the upper portion of the Z intersects with the lower side arm portion 46 of the lower portion of the Z and where the upper arm wall portion 49 of the lower portion intersects with the upper side wall portion 45 of the upper portion, respectively.

Figure 4A:
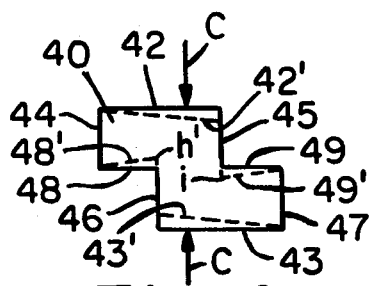

Referring now to FIG. 4a, Z-shaped cell 40 is shown being subjected to a compressive force along arrows C, with the result that the movable or expansion joints h, i are displaced to a new position h' and i', respectively. The compressive force to top wall portion 42 and bottom wall portion 43 is transmitted to the expansion joints i, h by upper side wall portion 45 and lower side wall portion 46 respectively, causing upper arm wall portion 49 to be pivotally displaced inwardly to position 49' and under arm wall portion 48 to be pivotally displaced inwardly to 48'. The longitudinal movement of upper side wall portion 45 and lower side wall portion 46 causes the top wall portion 42 and bottom wall portion 43 to be pivotally displaced inwardly to their new positions 42' and 43', respectively. If a tensile force were substituted for the compressive force, the same members would be displaced, but in an opposite direction outwardly of the cell 40. Further, if a compressive force were applied 90 degrees to that shown in FIG. 4a, wall portions 44, 45, 46 and 47 would be pivotally displaced inwardly and wall portions 48 and 49 would be longitudinally displaced toward one another so as to move expansion joints h and i toward one another.

Figure 5:
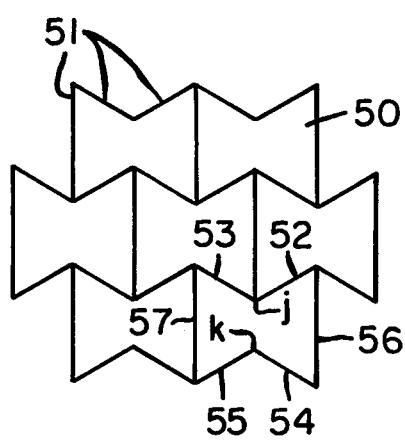
FIG. 5 is an enlarged schematic view of a fragment of the face of a honeycomb structure taken perpendicular to the longitudinal axis of said structure showing a "bow tie" shaped cellular configuration.

Referring now to FIG. 5, the bow tie shaped cells 50 are formed from the webbing or partitions 51 of the honeycomb matrix which provide inwardly tapered top wall portions 52, 53, inwardly tapered bottom wall portions 54, 55, and end or side wall portions 56, 57. The inwardly tapered top wall portions and bottom wall portions intersect centrally of the end wall portions to form movable joints or expansion corners j, k, respectively.

Figure 5A:
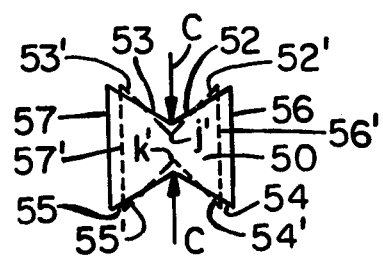

Referring now to FIG. 5a, a compressive force shown by arrows C is exerted across the top and bottom wall portions of the bow tie cell 50, with the result that the expansion joints j, k are displaced inwardly to a new position j', k'. The top wall portions 52, 53 and the bottom wall portions 54, 55 are displaced so as to taper further inwardly adjacent the expansion joints to new positions 52', 53', 54', and 55', respectively. In addition, the side wall portions 56 and 57 are displaced transversely inwardly to new positions 56' and 57', respectively. If compressive forces were exerted 90 degrees to that shown in FIG. 5a, the result would be identical to that shown, whereas were tensile forces substituted for the compressive forces, the wall portions would be displaced outwardly rather than inwardly as shown.

It will be apparent from the description of the various cell structures, that a cell was arbitrarily picked from each cell matrix for purposes of description. However, where a wall portion bounding the cellular structure may be defined as a "top", "bottom", "side" or other wall portion, such structure may in fact also be a different wall portion of an adjacent cell. Thus it is not the applicants' intention to be limited by the particular nomenclature given a specific wall portion since a particular designation with respect to a given cell could vary relative to adjacent cells within an overall honeycomb structure. In all of the various cellular structures shown, at least one expansion joint is provided for facilitating the movement of each cellular structure to compensate for induced stresses which may be simultaneously applied radially about the cell and resist thermal shock breakage. That is, when a cool ceramic structure is heated, or a hot structure cooled, a change in dimensions occurs due to the inherent coefficient of thermal expansion of the material utilized. If the temperature change occurs suddenly, producing radial temperature gradients, or the structure is constrained from expanding or contracting, stresses large enough to cause structural failure may occur if provision is not made to compensate therefor. Accordingly, the present invention includes a large number of expansion joints or movable corners into the honeycomb matrix forming the individual cellular structures, whereby such joints may tolerate large strains applied simultaneously from different directions without structural failure.

Upon reviewing the deflection which occurs in the cell structures of FIGS. 1a–4a, which all have at least one L shape incorporated in such structures, the movable or expansion joints a-i might be called "passive" expansion joints, since they are all characterized by the intersection of a maximum of two wall portions to form right angle joints with discontinuous webs or wall portions at such joints. Such joints can be squeezed or stretched from either direction without causing discernible displacements in a direction perpendicular to the direction in which such compressive (squeezing) or tensile (stretching) forces are applied, and accordingly such structures do possess considerable strain tolerance. The bow tie cellular structure of FIG. 5a has a pair of expansion joints j, k which could be deemed as "active" joints since a contraction in the joints due to a force exerted in one direction causes a contraction within the cellular structure in a direction perpendicular to that in which the force is applied. Such movement of the cellular structure accommodates the expansions and contractions within the honeycomb structure caused by temperature changes as are occasioned with honeycomb structures utilized as catalytic supports in emission control systems.

When testing the various cellular structures for thermal shock resistance, it was found that a typical square cell honeycomb structure could withstand a thermal shock from only about 700° C., whereas a T-shaped cellular structure such as set forth in FIG. 1, would survive a thermal shock from 1100° C. and a bow tie cellular structure such as shown in FIG. 5, could survive a thermal shock from 1200° C. Thus, it can be concluded that both the passive expansion joints of FIG. 1 and the active expansion joints of FIG. 5 offer considerble thermal shock resistance over that obtained from conventional square shaped cells.

Although we have disclosed the now preferred embodiments of our invention, it will be apparent to those skilled in the art that various changes and modifications may be made thereto without departing from the spirit and scope thereof as defined in the appended claims.

We claim:

1. A honeycomb structure having improved thermal shock resistance which comprises, a ceramic body having a plurality of individual cells extending longitudinally therethrough, a plurality of interconnected wall portions forming said cells, said cells extending across the areal extent of said ceramic body and being of uniform size and shape, each said cell being formed with at least one movable joint formed by the intersection of two wall portions, and said movable joint and said wall portions forming the same being displaced upon the application of a force to said cellular structure to compensate for stresses generated by such force and inhibit the structural failure thereof.

2. A honeycomb structure having improved thermal shock resistance comprising; a unitary ceramic body having a plurality of web portions which form a matrix of cells extending longitudinally through said body; said web portions defining partitions between, and wall portions of, the cells forming the matrix of the cellular structure; said plurality of cells, when viewed in a plane perpendicular to a longitudinal axis through said ceramic body, extending across the plane of said body and, with the exception of peripheral cells, all being of uniform size and shape; and each of said cells having joint means formed by the intersection of adjacent wall portions which is movable to compensate for stresses which may be thermally induced within the cellular structure.

3. A honeycomb structure having improved thermal shock resistance which comprises, a ceramic body having a plurality of individual cells extending longitudinally therethrough, a plurality of interconnected wall portions forming said cells, said cells extending across the areal extent of said ceramic body and being of uniform size and shape, each said cell being formed with at least one movable joint formed by the intersection of two wall portions, said movable joint and said wall portions forming the same being displaced upon the application of a force to said cellular structure to compensate for stresses generated by such force and inhibit the structural failure thereof, said plurality of individual cells of uniform size and shape being in the form of a T shape having an upper portion and a stem portion, and each said T-shaped cell having two movable joints formed at the intersection of said upper portion and said stem portion which provide movement to compensate for thermal stresses generated in the cellular structure.

4. A honeycomb structure having improved thermal shock resistance which comprises, a ceramic body having a plurality of individual cells extending longitudinally therethrough, a plurality of interconnected wall portions forming said cells, said cells extending across the areal extent of said ceramic body and being of uniform size and shape, each said cell being formed with at least one movable joint formed by the intersection of two wall portions, said movable joint and said wall portions forming the same being displaced upon the application of a force to said cellular structure to compensate for stresses generated by such force and inhibit the structural failure thereof, said plurality of individual cells of uniform size and shape being in the form of an L shape having an upright portion and a base portion, and each said L-shaped cell having a movable joint between said base and upright portions to compensate for thermally induced stresses and generated in said cellular body.

5. A honeycomb structure having improved thermal shock resistance which comprises, a ceramic body having a plurality of individual cells extending longitudinally therethrough, a plurality of interconnected wall portions forming said cells, said cells extending across the areal extent of said ceramic body and being of uniform size and shape, each said cell being formed with at least one movable joint formed by the intersection of two wall portions, said movable joint and said wall portions forming the same being displaced upon the application of a force to said cellular structure to compensate for stresses generated by such force and inhibit the structural failure thereof, said plurality of individual cells of uniform size and shape being in the form of a plus shape having four outwardly projecting protrusions, and said plus-shaped cell having four movable joints with each formed at an intersection of adjacent ones of said protrusions to compensate for thermally induced stresses in said cellular structure.

6. A honeycomb structure having improved thermal shock resistance which comprises, a ceramic body having a plurality of individual cells extending longitudinally therethrough, a plurality of interconnected wall portions forming said cells, said cells extending across the areal extent of said ceramic body and being of uniform size and shape, each said cell being formed with at least one movable joint formed by the intersection of two wall portions, said movable joint and said wall portions forming the same being displaced upon the application of a force to said cellular structure to compensate for stresses generated by such force and inhibit the structural failure thereof, said plurality of individual cells of uniform size and shape being in the form of a Z shape having upper and lower portions, and a pair of movable joints at the intersection of said upper and lower portions which compensate for thermal stresses induced in said cellular structure.

7. A honeycomb structure having improved thermal shock resistance comprising; a unitary ceramic body having a plurality of web portions which form a matrix of cells extending longitudinally through said body; said web portions defining partitions between, and wall portions of, the cells forming the matrix of the cellular structure; said plurality of cells, when viewed in a plane perpendicular to a longitudinal axis through said ceramic body, extending across the plane of said body and, with the exception of peripheral cells, all being of uniform size and shape; each of said cells having joint means formed by the intersection of adjacent wall portions which is movable to compensate for stresses which may be thermally induced within the cellular structure; said plurality of cells of uniform size and shape being in the form of a T shape having a pair of movable joints, and each one of said movable joints being formed by the intersection of a pair of adjacent wall portions.

8. A honeycomb structure having improved thermal shock resistance comprising; a unitary ceramic body having a plurality of web portions which form a matrix of cells extending longitudinally through said body; said web portions defining partitions between, and wall portions of, the cells forming the matrix of the cellular structure; said plurality of cells, when viewed in a plane perpendicular to a longitudinal axis through said ceramic body, extending across the plane of said body and, with the exception of peripheral cells, all being of uniform size and shape; each of said cells having joint means formed by the intersection of adjacent wall portions which is movable to compensate for stresses which may be thermally induced within the cellular structure; said plurality of cells having uniform size and shape each having a pair of movable joints, and each said pair of movable joints being movable toward each other inwardly of said cell.

9. A honeycomb structure having improved thermal shock resistance comprising; a unitary ceramic body having a plurality of web portions which form a matrix of cells extending longitudinally through said body; said web portions defining partitions between, and wall portions of, the cells forming the matrix of the cellular structure; said plurality of cells, when viewed in a plane perpendicular to a longitudinal axis through said ceramic body, extending across the plane of said body and, with the exception of peripheral cells, all being of uniform size and shape; each of said cells having joint means formed by the intersection of adjacent wall portions which is movable to compensate for stresses which may be thermally induced within the cellular structure; said plurality of cells of uniform size and shape each having a plurality of movable joints, and each of said joints being formed by the intersection of a maximum of two wall portions forming said cellular structure.

10. A honeycomb structure having improved thermal shock resistance which comprises, a ceramic body having a plurality of individual cells extending longitudinally therethrough, a plurality of planar interconnected wall portions forming said cells, said cells extending across the areal extent of said ceramic body and being of substantially uniform size and shape, each said cell being formed with at least one movable joint formed by the intersection of two planar wall portions, and said movable joint and said planar wall portions forming the same being displaced upon the application of a force to said cellular structure to compensate for stresses gener ated by such force and inhibit the structural failure thereof.

11. A honeycomb structure having improved thermal shock resistance comprising; a unitary ceramic body having a plurality of planar web portions which form a matrix of cells extending longitudinally through said body; said web portions defining planar partitions between, and planar wall portions of, the cells forming the matrix of the cellular structure; said plurality of cells, when viewed in a plane perpendicular to a longitudinal axis through said ceramic body, extending across the plane of said body and, with the exception of peripheral cells, all being of uniform size and shape; and each of said cells having joint means formed by the intersection of adjacent planar wall portions which is movable to compensate for stresses which may be thermally induced within the cellular structure.

12. A honeycomb structure having improved thermal shock resistance as defined in claim 11 wherein said plurality of cells of uniform size and shape are of a bow tie shape having end portions which converge toward a central portion, and a pair of movable joints formed at said central portion which compensate for thermal stresses induced in said cellular structure.

* * * * *